United States Patent [19]

Weber

[11] 4,064,897
[45] Dec. 27, 1977

[54] TIRE FILLER VALVE ARRANGEMENT

[75] Inventor: Rudiger Weber, Neureut, Germany

[73] Assignee: Firma Dr. Ing. h.c.F. Porsche AG, Germany

[21] Appl. No.: 640,180

[22] Filed: Dec. 12, 1975

[30] Foreign Application Priority Data

Dec. 12, 1974 Germany .............................. 2458729

[51] Int. Cl.² ............................................ F16K 15/20
[52] U.S. Cl. .................................. 137/224; 137/512.3;
    137/512.4; 137/516.15; 137/538; 137/539.5
[58] Field of Search ............ 137/223, 224, 230, 539.5,
    137/516.15, 512.4, 512.5, 512.3, 535, 538, 539,
    226; 285/244, 318

[56] References Cited

U.S. PATENT DOCUMENTS

| 1,588,046 | 6/1926 | Nelson | 137/224 |
| 1,732,918 | 10/1929 | Sutton | 137/230 X |
| 1,854,518 | 4/1972 | Little | 137/516.15 |
| 1,934,571 | 11/1933 | Sutton | 137/224 |
| 2,691,988 | 10/1954 | Weatherhead | 137/512.4 X |
| 2,757,685 | 8/1956 | Fritsch | 137/516.15 X |
| 2,761,468 | 9/1956 | Thatcher | 137/539 |
| 3,207,179 | 9/1965 | Klagues | 137/539.5 X |
| 3,556,122 | 1/1971 | Laerdal | 137/512.3 X |
| 3,910,305 | 10/1975 | Hughes | 137/224 |

Primary Examiner—Harold W. Weakley
Attorney, Agent, or Firm—Craig & Antonelli

[57] ABSTRACT

A filler valve arrangement for vehicle tires which includes a valve body having an air inlet passage and an auxiliary passage communicating therewith in which auxiliary passage is disposed and over-pressure valve which is normally biased into a closed position by an annular spring arranged in a recess or channel provided at the periphery of the valve body.

8 Claims, 4 Drawing Figures

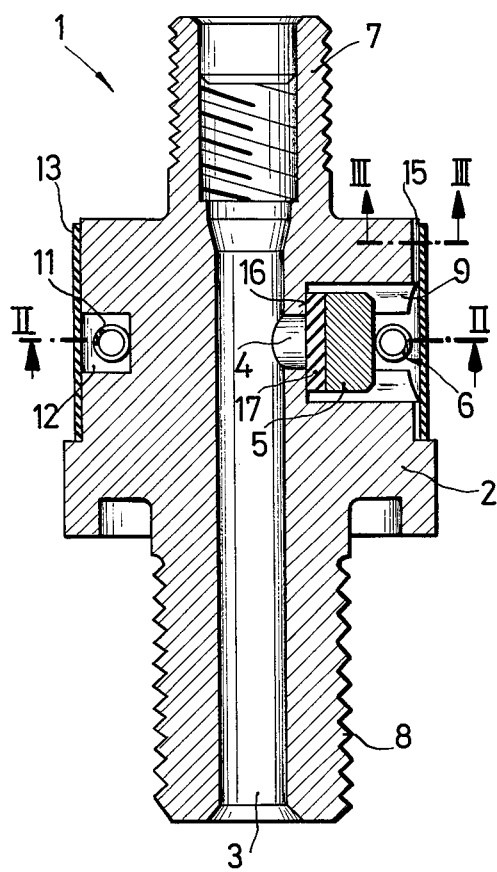
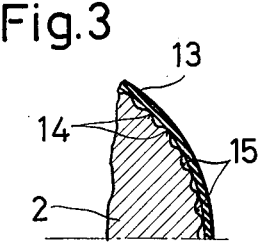
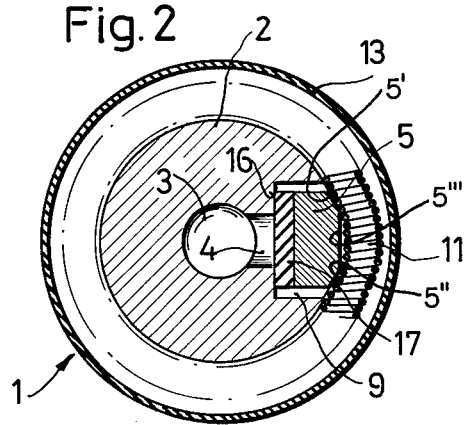
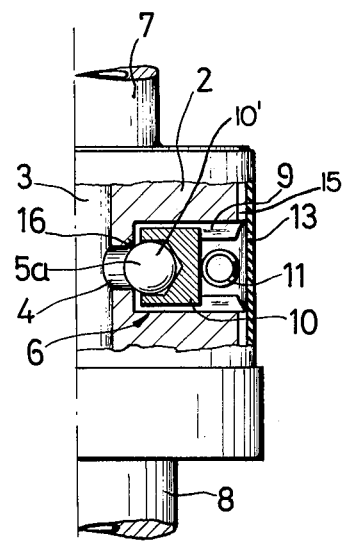

TIRE FILLER VALVE ARRANGEMENT

The present invention relates to a filler valve arrangement, and more particularly to a filler valve arrangement for motor vehicle tires which includes an over-pressure valve disposed in an auxiliary passage communicating with the air inlet passage, with the over-pressure valve being normally biased into a closed position by a spring.

In German Pat. No. 540,581, an air inlet valve is disclosed which includes an over-pressure valve located in an auxiliary channel or passage of an air inlet passage. A valve plate of the over-pressure valve is supported by a leaf spring which is fastened at the valve body which leaf spring presses the valve plate against a valve seat by means of a yoke on which tensioned springs act. A disadvantage of an over-pressure valve of this type construction resides in the fact that a number of individual springs are required which springs must be interconnected with each other in an expensive constructed manner. Furthermore, the springs must be fastened to the valve body by screws or the like thereby further complicating the constructions of the convention over-pressure valve. A further disadvantage of the conventional pipe construction resides in the fact that due to the presence of the large number of individual elements forming the over-pressure valve a greater susceptibility to potential malfunctioning of the over-pressure valve is present.

The present invention is concerned with the task to provide a structurally simple tire valve arrangement for vehicle tires which operates reliably while eliminating the aforementioned shortcomings encountered in the prior art.

The underlying problems are solved in accordance with the present invention in that at least one ring-shaped or annular spring is provided and arranged at the valve body of the tire filler valve which spring serves as the control spring for the over-pressure valve. Preferably, in accordance with the present invention, the annular spring is constructed as a cylindrical helical coil or wound worm spring.

In accordance with another inventive feature of the present invention, the annular spring is countersunk or arranged in an annular recess provided in the valve body. By virtue of this construction, expensive holding and fastening means for the spring are unnecessary and the spring can readily be assembled and replaced in a simple manner.

According to a further feature of the present invention a chamber or groove is also provided in the valve body for receiving the valve means with a cylindrical guide being provided in such chamber for guiding the valve body toward and away from a valve seat. By virtue of this construction, no portion of the over-pressure valve projects beyond the outer contour of the valve body.

According to still another feature of the present invention a tubular sleeve-like covering is provided for sealing the over-pressure valve against dust and other foreign matter. The sleeve-like cover seals the recess for groove receiving the annular spring as well as the chamber, guide element and valve.

According to another advantageous feature of the present invention, at least a portion of the periphery of the valve body is provided with at least one channel or groove which serves as an air passage for directing excess air from the over-pressure valve to the environment. If more than one channel is provided, the channels are spaced by a wall surface of the valve body which surface then functions as a bearing or support surface for the tubular covering.

Accordingly, it is an object of the present invention to provide a filler arrangement for vehicle tires which avoids by simple means the aforementioned shortcomings and drawbacks encountered in the prior art.

Another object of the present invention resides in providing a tire filler arrangement which is relatively simple in constructions and therefore also relatively inexpensive.

A further object of the present invention resides in providing a tire filler arrangement which assures a reliable operation of the over-pressure valve under all operating conditions.

A still further object of the present invention resides in providing a tire valve arrangement which minimizes failures or breakdowns due to malfunctioning of the over-pressure valve.

Another object of the present invention resides in providing a tire valve arrangement which includes an over-pressure valve which operates reliably with a minimum number of parts.

A further object of the present invention resides in providing a tire valve arrangement which includes an over-pressure valve which is realtively light and of small dimensions.

Still another object of the present invention resides in providing a tire filler arrangement with an over-pressure valve which does not project beyond the outer contour of the valve body.

These and further objects, features, and advantages of the present invention will become more apparent from the following description when taken in connection with the accompanying drawing which shows, for purposes of illustration only, two embodiments in accordance with the present invention, and wherein:

FIG. 1 is a frontal cross-sectional view of a filler valve arrangement in accordance with the present invention;

FIG. 2 is a cross-sectional view taken along line II—2 of FIG. 1;

FIG. 3 ia a partial cross-sectional view taken along line III—3 of FIG. 1; and

FIG. 4 is a partial cross-sectional frontal view of a further embodiment of a tire filler valve arrangement in accordance with the present invention.

Referring now to the drawing wherein like reference numerals are used throughout the various views to designate like parts, and more particularly to FIGS. 1 and 2, according to these figures, a tire filler valve generally designated by the reference numeral 1 includes a valve body 2 having an air inlet passage or bore 3 communicating with a further laterally extending bore or passage 4. The passage 4 communicates with a recess or chamber 20 in which is arranged an over-pressure valve generally designated by the reference numeral 6 at the point where the passage 4 enters the chamber 20.

The valve body terminates in an upper extension 7 with the passage 3 extending therethrough. At least a portion of the passage 3 in the extension 7 is provided with a suitable threading or the like for accommodating a conventional air valve (not shown). Additionally, suitable threads or the like may be provided around at least a portion of the outer periphery of the extension 7 whereby a conventional cap or closure (not shown) may be threadably secured thereon.

The valve body 2 terminates at its lower end in a further projection or extension 8 which may be provided with a suitable threading whereby the valve body 2 may be threadably inserted into a wheel rim (not shown) and/or an inflatable vehicle tube (not shown).

The over-pressure valve includes a valve element or plunger 5 which is arranged in a cylindrical guide 9 formed in the chamber of the valve housing. A surface of the valve element 5 facing the passage 4 is provided with a layer 17 of preferably elastic material to enhance the sealing action of the valve element 5.

An annular channel or groove 12 is provided about the periphery of the valve body 2 with a cylindrical helical spring 11 of circular cross-section being disposed in the channel 12. A portion of the spring 11 engages the valve element 5 and normally biases the valve element and the layer 17 against a valve seat 16 thereby closing the communication between the passages 3 and 4 and the chamber housing the valve element 5. Preferably, the spring 11 is a ring-shaped or coil spring wound around the valve body 2, for example, formed as a wound worm spring. As readily apparent, the spring characteristic or spring force of the spring 11 is selected so that the force exerted on the valve element 5 corresponds to the desired pressure in the vehicle tire. Specifically, the force of the spring is such that the valve element remains seated against the valve seat 16 when the vehicle tire is inflated at a desired pressure.

As shown most clearly in FIG. 2, the end of the valve element 5 opposite the layer 17 includes a pair of spaced inclined surfaces 5', 5" which are interconnected by a further surface 5''' disposed substantially parallel to the surface of the valve element upon which the layer 17 is provided. By virtue of this construction, the valve element 5 is centered by the spring 11 as the valve element is urged toward the seat 16 thereby ensuring an accurate alignment of the valve member 5 relative to the passage 4.

The valve element 5 is disposed in the cylindrical guide 9 and the spring 11 is then arranged in the channel or groove 12 so as to engage the valve element 5 and a wall of the channel or groove 12 whereby the spring is supported at the valve body 2. A sleeve 13 is then pushed over the valve body 2 so as to cover the assembled over-pressure valve 6. The sleeve 13 consists of a material which protects the over-pressure valve assembly from intrusion by dust particles or other foreign material. Preferably, the sleeve 13 is formed of an elastic material.

As shown in FIG. 3, at least a portion of the valve body 2 in the area of the over-pressure valve 6 is fluted or milled so as to result in the formation of a plurality of parallel grooves or channels 15 which extend in the axial direction of the filler valve 1. The projecting surfaces 14 formed by the valve body 2 between adjacent grooves 15 form support surfaces for the sleeve 13. The parallel grooves or channels 15 serve for releasing air from the tire filler valve 1 upon the occurrence of an over pressure.

According to FIG. 4, an over-pressure valve generally designated by the reference numeral 6' is arranged in a cylindrical guide 9 formed in a chamber provided in the valve body 2. The over-pressure valve 6' includes a valve element or plunger 10 which is provided with a recess or groove at one end thereof for receiving a second valve element 5a which is in the form of a ball.

The spring 11 is disposed in an annular recess or channel and engages the valve element 10 so as to normally bias the valve elements 5a, 10 into engagement with the valve seat 16. The sleeve 13 is provided about the periphery of the valve body 2 for protecting the over-pressure valve assembly with grooves 15 being provided for releasing air from the filler valve 1 upon the occurrence of an over pressure.

The mode of operation of the embodiments described hereinabove is as follows:

The vehicle tire is filled with air through the air valve (not shown) and air passage 3 and, upon the occurrence of an over pressure, the valve elements 5, 17 or 5a, 10 of the over-pressure valves 6 or 6' are displaced from the valve seat 16 by the force of the excess air thereby overcoming the tension or bias of the spring 11 whereby the excess amount of compressed air escapes through passage 4 to the outside of the filler valve 1 through channels or grooves 15. The excess air continues to flow through the passage 4 until the internal pressure of the vehicle tire has reached a value corresponding to the predetermined tension of the spring 11. Upon reaching this value the valve elements 5, 7 or 5a, 10 are then displaced against the valve seat 16 by the force of the spring 11 whereby the passage 14 is then closed.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A valve arrangement for filling a tire with air, the arrangement comprising: a valve body, a first passage means for communicating said first passage means with the environment, a valve means including a valve plunger disposed at said second passage means for selectively controlling the communication between said first passage means and the environment, said valve means having a first closed position and a second open position, at least one cylindrical helical spring of circular cross-section disposed about a periphery of said valve body and engaging said valve plunger for normally biasing said valve plunger into said closed position, an annular recess means provided about the periphery of said valve body for receiving said cylindrical helical spring, said cylindrical helical spring having a spring characteristic corresponding to a desired inflation value of a vehicle tire whereby, upon the air in a vehicle tire exceeding the desired inflation valve, said valve plunger is displaced to said open position against the bias of said cylindrical helical spring to communicate said first passage means with the environment thereby expelling excess air from a vehicle tire, and wherein at least one channel means is provided along at least a portion of the periphery of said valve body extending in an axial direction of the valve body, said channel means communicating with said second passage means whereby the excess air is expelled from a tire through said channel means.

2. An arrangement according to claim 1, wherein at least two channel means are provided and spaced from each other by a surface of said valve body, each of said channels extending in an axial direction of the valve body, said surface forming a support surface for said tubular sleeve member.

3. An arrangement according to claim 2, wherein said valve is displaceably guided in said guide means, and wherein means are provided on said valve plunger for sealing said second passage means when said valve plunger is in said closed position.

4. An arrangement according to claim 3, wherein said means for sealing includes a ball element, said valve plunger being provided at an end face thereof with a means for accommodating said ball element.

5. An arrangement according to claim 3, wherein said means for sealing is a layer of sealing material provided on an end surface of said plunger means.

6. An arrangement according to claim 5, wherein said sealing material is an elastic material.

7. An arrangement according to claim 5, wherein said valve plunger includes means engaged by said cylindrical helical spring for centering said valve plunger with respect to said second passage.

8. An arrangement according to claim 7, wherein said valve plunger centering means includes a pair of spaced inclined surfaces provided on a side of said valve plunger facing said cylindrical helical spring.

* * * * *